United States Patent [19]

Bastiaansen et al.

[11] Patent Number: 4,888,141

[45] Date of Patent: Dec. 19, 1989

[54] PROCESS FOR PRODUCING POLYETHYLENE ARTICLES HAVING A HIGH TENSILE STRENGTH AND MODULUS

[75] Inventors: Cornelis W. M. Bastiaansen, Sittard; Pieter J. Lemstra, Brunssum; Lambert H. T. Van Unen, Heerlen, all of Netherlands

[73] Assignee: Stamicarbon B.V., Geleen, Netherlands

[21] Appl. No.: 106,457

[22] Filed: Oct. 9, 1987

Related U.S. Application Data

[63] Continuation of Ser. No. 897,935, Aug. 19, 1986, abandoned.

[30] Foreign Application Priority Data

Aug. 21, 1985 [NL] Netherlands .................... 8502298

[51] Int. Cl.$^4$ ............................................. B29C 35/08
[52] U.S. Cl. ...................................... 264/22; 264/171; 264/210.7; 264/211.18; 264/289.3; 264/331.17
[58] Field of Search ..................... 264/22, 171, 331.17, 264/210.7, 289.3, 211.18; 425/379 R

[56] References Cited

U.S. PATENT DOCUMENTS

| 3,886,056 | 5/1975 | Kitamaru et al. ................. 264/22 |
| 3,887,319 | 6/1975 | Cottingham ................. 425/379 R |
| 4,411,854 | 10/1983 | Maurer et al. ................. 264/210.8 |
| 4,422,993 | 12/1983 | Smith et al. ................. 264/210.8 |
| 4,430,383 | 2/1984 | Smith et al. ................. 264/210.8 |
| 4,436,689 | 3/1984 | Smith et al. ................. 264/210.8 |
| 4,600,631 | 7/1986 | Alei et al. ................. 264/171 |
| 4,600,633 | 7/1986 | Kono et al. ................. 264/204 |
| 4,616,059 | 10/1986 | Motooka et al. ................. 264/210.8 |
| 4,617,233 | 10/1986 | Ohta et al. ................. 264/210.8 |
| 4,643,865 | 2/1987 | Okada et al. ................. 264/204 |
| 4,655,769 | 4/1987 | Zachariades ................. 264/331.15 |

FOREIGN PATENT DOCUMENTS

| 0055001 | 6/1982 | European Pat. Off. ......... 264/210.8 |
| 0139141 | 5/1985 | European Pat. Off. ......... 264/210.1 |
| WO/5316/85 | 12/1985 | European Pat. Off. ............. 264/22 |
| 58-217322 | 12/1983 | Japan ................. 264/210.6 |
| 59-216913 | 12/1984 | Japan ................. 264/210.7 |
| 59-216914 | 12/1984 | Japan ................. 264/210.7 |
| 60-59172 | 4/1985 | Japan ................. 264/22 |
| 60-132744 | 7/1985 | Japan ................. 264/25 |
| 60-236716 | 10/1985 | Japan ................. 264/204 |

Primary Examiner—Jeffery Thurlow
Attorney, Agent, or Firm—Cushman, Darby & Cushman

[57] ABSTRACT

High strength and modulus articles, such as filaments, fibers, tapes, films, tubes, bars or profiles, are prepared by irradiating a solid, particular, lamellar, disentangled polyethylene with a $Mw > 4 \times 10^5$, transforming this polyethylene above the melt temperature into an article, cooling said article to below the melting point and stretching it in several steps at rising temperature but below the melting point of the article.

Advantages are i.a. the lower costs compared with the known processes, such as solid state extrusion or thermoreversible gelation.

10 Claims, No Drawings

PROCESS FOR PRODUCING POLYETHYLENE ARTICLES HAVING A HIGH TENSILE STRENGTH AND MODULUS

This is a continuation of application Ser. No. 897,935 filed Aug. 19, 1986, now abandoned.

The invention relates to a process for producing polyethylene articles with a high modulus and a high tensile strength on the basis of a solid, particle-shaped, linear polyethylene with a lamellar structure, a low degree of entanglement and a high weight-average molecular weight, particularly above $4 \times 10^5$.

It is known, see for instance Polymer Journal 15 (1983), pages 327 ff., how to press high-molecular linear polyethylene with a lamellar structure and a low degree of entanglement ('disentangled polyethylene'), for instance in the form of monocrystals, at a high pressure through a small hole in the form of a solid (powder) while forming a well stretchable strand. A disadvantage of this process is that it requires very high pressures and, moreover, that spinning via a spinning plate is not possible, because the powdery material does not flow. Application of this known process on a technological scale therefore seems to be virtually ruled out.

It is also known that, if such a disentangled polyethylene is spun above its melting point and subsequently cooled again, the resulting material can hardly be stretched and consequently does not provide a product with a high strength and modulus, see inter alia Paper on 'Speciality products based on commodity Polymers' by P. Lemstra and R. Kirschbaum, presented during the Conference on Speciality Polymers at Birmingham on Sept. 21, 1984.

It is known how to produce articles, such as fibres, with excellent tensile strength and modulus on the basis of semi-dilute solutions of high-molecular polymers, particularly polyethylene, by spinning or extruding these, subsequently subjecting them to thermoreversible gelling and finally stretching them, see for instance US-A-4,344,908; 4,422,993; 4,430,383; 4,411,854 and 4,436,689. Although in this process superstrong articles are obtained, its disadvantages are the relatively low concentrations and the reduced yield and higher cost of solvent separation and recovery involved. Moreover, this process is less suitable for the production of profiles.

The present invention now provides a process for producing polyethylene articles, such as filaments, fibres, tapes, bands, ribbons, films, tubes, bars or profiles in which the said disadvantages do not occur.

The invention therefore relates to a process for producing polyethylene articles with a high tensile strength and a high modulus on the basis of a solid, particle-shaped, linear polyethylene with a lamellar structure, a low degree of entanglement and a weight-average molecular weight of at least $4 \times 10^5$, this process being characterized in that the polyethylene is subjected to irradiation, the irradiated polyethylene is transformed into an article at a temperature above the melting point, this article is cooled to below the melting point and subsequently stretched in a plurality of steps at rising temperatures, but below the melting point of the polyethylene article to be stretched.

In the present process it is possible to produce articles such as tapes, etc., having very high tensile strengths, for instance higher than 1.5 GPa and even higher than 2 GPa, and moduli, for instance higher than 50 GPa and even higher than 75 GPa.

In the process according to the invention a linear polyethylene is used having a weight-average molecular weight of at least $4 \times 10^5$, particularly of at least $5 \times 10^5$ and preferably of at least $8 \times 10^5$.

Linear polyethylene is understood to mean in this connection polyethylene capable of containing minor amounts, preferably 5 moles % at most, of one or more other alkenes copolymerized therewith, such as propylene, butylene, pentane, hexene, 4-methylpentene, octene, etc., with at least 100 unbranched carbon atoms and preferably at least 300 unbranched carbon atoms between carbon atoms provided with side chains with more than 1 C-atoms. The polyethylene may contain minor amounts, preferably 25% (wt) at most, of one or more other polymers, particularly an alkene-1-polymer, such as polypropylene, polybutylene or a copolymer of propylene with a minor amount of ethylene.

The polyethylene must further have a lamellar structure and a low degree of entanglement ('disentanglement'). Such a polyethylene can be obtained in various ways known per se, for instance by crystallization from dilute polyethylene solutions, by spinning dilute solutions followed by cutting of the filaments, by extruding dilute solutions and granulating the extrudate. Another possibility is polymerization (in suspension) under such conditions that immediately disentangled and lamellar polyethylene is formed, see for instance 'Ziegler-Natta Catalysts and Polymerizations', by Boor, J. 1979, Academic Press Inc., page 202.

The polyethylene is subjected to irradiation according to the invention in a solid form, for instance as powder or granulate.

The source of radiation applied may in the first place be an electron beam donor, but in principle a gamma ray source can also be used. A survey of the customary radiation sources and radiation methods is given in Rubber Chemistry and Technology 55 (1982), pages 575–668. The chosen dosage is generally between 1-20 MRAD, particularly 1-10 MRAD, preferably 2-6 MRAD.

The transformation of the irradiated polyethylene into an article can be done in various ways, for instance by spinning via a spinning head with a round or slit-shaped die, or by extrusion via an extruder usually with a profile head.

During the transformation the chosen temperature must be higher than the melting temperature of the polyethylene, generally higher than 135° C. Preferably this chosen temperature is lower than 155° C. The fact is that surprisingly it has been found that within this narrow temperature range (135°–155° C.) high-molecular polyethylene is highly mouldable.

In the present process it may be an advantage to carry out the transformation in the presence of one or more plasticizers, generally to a maximum of 100% (wt), and preferably 5-40% (wt), calculated on the polyethylene. As plasticizer various agents may be used, inter alia aliphatic hydrocarbons, such as paraffins or paraffinic waxes, aromatic hydrocarbons, such as xylene, or hydroaromatic hydrocarbons, such as decalin or tetralin. Preference is given to using relatively volatile plasticizers, such as decalin.

When using a plasticizer/polyethylene mixture the chosen transformation temperature is above the melting point of the mixture, but of course below the decomposition temperature of the polyethylene.

The article obtained in the transformation is subsequently cooled to below the melting temperature, for instance to 60°-120° C., and successively stretched. In the process the stretching is done at elevated temperature, generally above 75° C., and particularly above 90° C. According to the invention the stretching takes place in a plurality of steps at rising temperature, but below the melting point of the polyethylene article to be stretched, which melting point increases to a maximum of about 155° C. while the molecular orientation increases, so while the degree of stretching increases.

Preference is given to stretching in a plurality of steps, the temperature in the first step being between 90° and 125° C. and in the final step between 140° and 155° C.

If a mixture of polyethylene and (volatile) plasticizer is stretched, the chosen conditions will preferably be such that the stretched article is virtually free of plasticizer. Any residual plasticizer can be removed as known in the art, for instance by extraction.

In the present process relatively high draw ratios can be realized, for instance above 20 and even higher than 30.

The products according to the invention are suitable for many applications.

Filaments and tapes can be used, for instance, as reinforcement in many articles that are known to be reinforced with fibres or filaments, and for all uses in which a low weight combined with a high strength is desirable, such as for instance rope, nets, filter cloths, fabrics, magnetic tapes.

The films according to the invention are suitable for many applications. They can be cut into strong ribbons, bands, tapes. They can be used as reinforcement in many materials that are known to be reinforced with films or tapes and for all applications in which a low weight combined with a high strength is desirable, such as for instance audiovisual or magnetic tapes, tapes for medical uses, pakcaging film, protective sheeting, substrates for adhesives, insulating films in condensers, etc.

If so desired, minor amounts of the usual additives, stabilizers, fibre-treating agents and the like can be incorporated in or on the articles, particularly amounts of 0.1-10% (wt) calculated on the polyethylene.

The invention is further elucidated in the following examples without, however, being limited thereto.

EXAMPLE

A solution of about 0.5% (wt) polyethylene, grade Hostalen GUR-412 (Ruhrchemie/Hoechst) with a Mw of about $1.5 \times 10^6$, in decalin with a temperature of 160° C. was cooled to about room temperature, in which process polyethylene crystallized out. The crystals were separated off and dried while forming a powder having a lamellar structure and a low entanglement density.

The powder thus obtained was irradiated under a vacuum using an electron accelerator of the HVE type with a voltage of 3 MV, the total dosage being about 5 MRAD, subsequently pressed at about 150° C. through a die with a width of 10 mm and a thickness of 2 mm to form a tapeshaped article. The tape was cooled to about 120° C. and successively stretched in three steps at 120° C., 140° C. and 150° C. with a total draw ratio of respectively 15, 20 and 30.

The resulting tape had a modulus of about 60 GPa and a strength of about 1.8 GPa.

We claim:

1. A process for producing polyethylene articles having a high tensile strength and a high modulus, comprising:
    irradiating a solid, particle-shaped, linear polyethylene having a lamellar structure, a low degree of entanglement and a weight-average molecular weight of at least $4 \times 10^5$;
    transforming the irradiated polyethylene into an article at a temperature above the melting point of the polyethylene;
    cooling the article to a temperature below the melting point of the polyethylene; and
    stretching the article, in a plurality of steps, with an increasing temperature, which is below the melting point of the polyethylene article, to form a polyethylene article having a high tensile strength and a high modulus.

2. The process according to claim 1, wherein irradiating the polyethylene is accomplished with electron irradiation.

3. The process according to claim 1, wherein the irradiation is about 1-20 Mrad.

4. The process according to claim 3, wherein the irradiation is about 2-6 Mrad.

5. The process of claim 1, wherein transforming the irradiated polyethylene occurs at a temperature between about 135° C. and 155° C.

6. The process of claim 1, wherein the particle-shaped polyethylene is in a mixture containing at least one plasticizer in an equal amount, based upon the weight of the polyethylene.

7. The process of claim 6, wherein the plasticizer is a paraffinic, hydroaromatic or aromatic hydrocarbon.

8. The process according to claim 6, wherein the transforming of the mixture of irradiated polyethylene and plasticizer occurs at a temperature above the melting point of the mixture but below the decomposition temperature of the polyethylene.

9. The process according to claim 1, wherein the stretching, in a plurality of steps, occurs at a temperature between about 90° C. and about 155° C.

10. The process according to claim 1, wherein product article is one comprising a filament, tape, film, tube, bar or profile.

* * * * *

UNITED STATES PATENT AND TRADEMARK OFFICE
CERTIFICATE OF CORRECTION

PATENT NO. : 4,888,141

DATED : December 19, 1989

INVENTOR(S) : Cornelis W.M. BASTIAANSEN et al.

It is certified that error appears in the above-identified patent and that said Letters Patent is hereby corrected as shown below:

In the abstract, line 4, please correct "$M_w > 4 \times 10^5$" to --$M_w \geq 4 \times 10^5$--;

Column 2, line 11, please change "pentane" to --pentene--.

Signed and Sealed this

Twelfth Day of February, 1991

Attest:

HARRY F. MANBECK, JR.

*Attesting Officer*　　*Commissioner of Patents and Trademarks*